No. 777,883. PATENTED DEC. 20, 1904.
E. R. CARICHOFF.
CONTROL SYSTEM.
APPLICATION FILED JUNE 2, 1904.
NO MODEL.
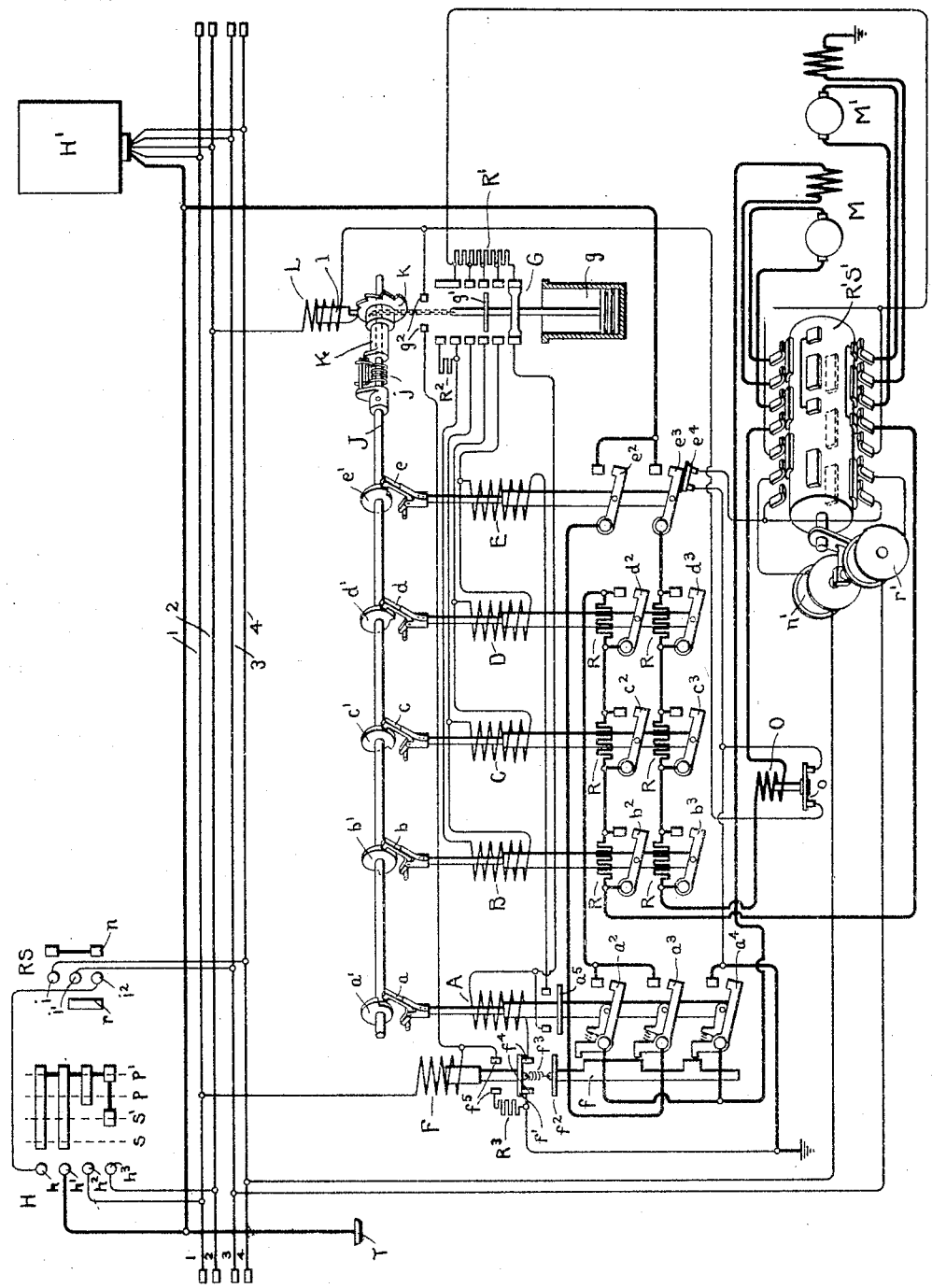
Witnesses.
J. Ellis Glen.
Helen Oxford
Inventor.
Eugene R. Carichoff.
By Albert H. Dan
Atty.

No. 777,883. Patented December 20, 1904.

UNITED STATES PATENT OFFICE.

EUGENE R. CARICHOFF, OF EAST ORANGE, NEW JERSEY, ASSIGNOR TO GENERAL ELECTRIC COMPANY, A CORPORATION OF NEW YORK.

CONTROL SYSTEM.

SPECIFICATION forming part of Letters Patent No. 777,883, dated December 20, 1904.

Application filed June 2, 1904. Serial No. 210,808.

*To all whom it may concern:*

Be it known that I, EUGENE R. CARICHOFF, a citizen of the United States, residing at East Orange, in the county of Essex and State of New Jersey, have invented certain new and useful Improvements in Control Systems, of which the following is a specification.

My invention relates to systems of control for electric translating devices, and is particularly adapted for use for controlling motors on electrically-propelled vehicles.

One of the objects of my invention is to simplify the construction and arrangement of the parts of a controller which are necessary for producing an efficient system of control for translating devices, whereby the translating devices are connected and combined in any predetermined order and all possibility of injury to the said translating devices, due to the too rapid increase of current therein, is eliminated.

In one of its aspects my invention comprises a motor-controlling switch, including a plurality of circuit-closers and an automatic switch controlling the operating mechanism of the circuit-closers, together with connections between each circuit-closer and the automatic controlling-switch, such that the closing of each circuit-closer places a strain upon the automatic controlling-switch, tending to move it slowly to the proper position for energizing the actuating mechanism of a second circuit-closer.

In still another aspect my invention consists of a plurality of switches, a resistance, resistance-control switches, switches for connecting said motors in series and in parallel relationship, means for closing one or more of said switches at the start, and means actuated by the closing of each switch for the closing of other switches successively after predetermined intervals, so as to produce an automatic acceleration of the motors, the said motors being first connected in series and then in parallel.

My invention comprises a plurality of motor-controllers, each arranged as above described, together with a master-controller for said motor-controllers and suitable connections between said master-controller and said motor-controller, the whole being adapted and arranged to produce a simple and efficient multiple-unit system of train control.

More specifically considered, my invention comprises a plurality of circuit-closers, a shaft arranged to be rotated step by step by the closure of each of said circuit-closers, a mechanism arranged to be placed under strain by the rotation of said shaft, a means for retarding the movement of said mechanism under said strain, and means for energizing the actuating mechanism of a second circuit-closer after said mechanism has moved a certain distance. The circuit-closers are arranged to cut out resistance successively from the circuits of the motor and are combined with a series-parallel device comprising automatic means for connecting the motors in series at the start and when all the circuit-closers are closed, so as to cut out all the resistance from circuit to connect the motors in parallel and at the same time to again open the circuit of all the circuit-closers.

My invention further comprises details of construction and arrangement which will be hereinafter described, and more specifically pointed out in the appended claims.

My invention will be best understood by reference to the accompanying drawing, in which A represents an actuating-coil or solenoid tending when energized to close the switches $a^2$, $a^3$, and $a^4$, which control the series and parallel connections of the motors M M'.

F is a second magnet-coil or solenoid controlling the selective device $f$ by means of which certain of the switches $a^2$ to $a^4$ are permitted to close and others prevented from closing, thereby determining whether the motors M M' are to be connected in series or in parallel.

E represents a magnet-coil controlling switches $e^2$ $e^3$, which coact with the switches controlled by magnet-coil A to close the motor-circuits.

B, C, and D represent three other magnet-coils each controlling a pair of switches and each connected so as to short-circuit when closed resistance-sections R R in the motor-circuits.

G represents an automatic control-switch which is operated by the closure of any one of the circuit-closers A to E and which acts to energize successively the magnet-windings of the other circuit-closers in a manner that will be hereinafter explained.

H H' represent master-controllers connected to the train-wires 1 to 4. RS represents the master reversing-switch and R' S' the motor-reversing switch controlled thereby.

The details of construction are as follows: Each of the switches controlled by magnet-windings A to E carries at its upper end a spring-pressed pawl $a$ $b$, &c. Each of these spring-pressed pawls—as, for instance, $a$—engages, when the circuit-closer rises to closed position, a notched cam $a'$ on the shaft J. By means of this engagement between the pawl and the cam shaft J is rotated a certain amount when magnet-coil A is energized. By this rotation the cam $e'$ is brought into position to be engaged by the spring-pressed pawl $e$ when magnet-winding E is energized to raise its circuit-closer. Similarly by successive rotations of the shaft J cams $d'$ $c'$ $b'$ are brought into position to be engaged by spring-pressed pawls $d$, $c$, and $b$. Consequently as the magnet-coils are successively energized in the order named shaft J will be given a step-by-step rotation. Shaft J is connected by means of the spring $j$ with a sleeve K, which carries a notched wheel $k$, which is engaged by the core $l$ of the solenoid L. Sleeve K is connected to the automatic controlling-switch G in such a manner that as shaft J is rotated the tension of spring $j$ upon sleeve K will tend to raise switch member G and cause it to traverse the stationary contacts shown. Switch member G carries a piston working in a dash-pot $g$ by means of which the motion of member G under the tension of spring $j$ is retarded. The switch member G also carries a bridging member $g'$, arranged to engage the stationary contacts $g^2$ when the switch member G reaches the upper limit of its travel.

R' and R$^2$ are resistances connected to the stationary contacts adapted to be traversed by bridging member G.

Circuit-closer A carries three spring-pressed circuit-closers $a^2$ to $a^4$, which when coil A is energized tend to engage the stationary contacts shown. The member $f$, controlled by coil F, acts as a selective device to permit the closure of some of the switches $a^2$ to $a^4$ and to prevent the closure of others. When in its lower position, as shown, it permits the closure of switch member $a^2$ and prevents the closure of switch members $a^3$ and $a^4$. When raised, it prevents the closure of switch member $a^2$ and permits the closure of switch members $a^3$ and $a^4$. The device $f$ is connected to the core of solenoid F through spring $f^3$ or other flexible connection, for the purpose which will be hereinafter explained. The device $f$ carries the bridging member $f^2$, which when the device $f$ is raised engages a pair of stationary contacts $f^4$. The core of solenoid F carries the bridging member $f'$, which in its lower position engages the contacts $f^4$ and in its upper position engages the contacts $f^5$.

R' S' is a reversing-switch adapted to vary the relative connections or armatures and fields of the motors M M' and is controlled by the magnet-coils $n'$ and $r'$, which act to draw it in one position or the other for forward or reverse rotation of the motors.

O is a throttle, the actuating-coil of which is connected in the motor-circuit and which operates to open the control-circuit and prevent further acceleration of the motors whenever the current in the motor-circuit passes a predetermined limit.

T represents the trolley or collector shoe which is connected to the master-controllers H and H'.

The controller H is shown with its contacts developed on a plane surface and comprises four stationary contact-fingers $h$ to $h^3$ and movable contacts for four positions $s$ $s'$ and $p$ $p'$, the first two corresponding to series connection of the motors and the last two to parallel connection of the motors. The master reversing-switch RS consists of three stationary contact-fingers $i$ to $i^2$ and movable contacts for forward and reverse rotation, (indicated by the letters $n$ and $r$, respectively.)

The operation is as follows: Assume the master controlling-switch H moved to bring the movable contacts on line $s$ into engagement with the stationary contact-fingers and the contacts $n$ of master reversing-switch RS brought into engagement with the stationary contact-fingers. The following circuit is then completed: from trolley T, finger $h'$, finger $h$, finger $i^2$, finger $i$, train-line 4, magnet-coil $n'$, through contacts on the motor-reversing switch R' S', to resistance R', switch member G, magnet-coil A, contact $f^4$, bridging member $f'$, to earth. Magnet-coil $n'$ is thus actuated, drawing the reversing-switch R' S' into the position shown, if it is not already in this position. Magnet-coil A is also energized, raising its core, closing the circuit-closer $a^2$, bringing spring-pressed pawl $a$ into engagement with cam $a'$, rotating shaft J one step and placing spring $j$ under strain. Although circuit-closer $a^2$ is thus closed, the motor-circuits are still open at the switches $e^2$ and $e^3$, controlled by magnet-coil E. As sleeve K, however, rotates under the tension of spring $j$, bridging member G will be moved upward, retarded by the dash-pot $g$, until it is brought into contact with the second pair of stationary contacts. A circuit will then be completed from train-line 4, through coil $n'$, reversing-switch R' S', a portion of resistance R', bridging member G, coil E, bridging member $a^5$, coil A, bridging member $f'$, to earth. Magnet-coil E is thus substituted for a section of the resistance R' in the control-circuit. Switches $e^2$ and $e^3$ are then closed, with the following results: In the first place, a circuit is closed from trolley T, through switch $e^3$, through the three lower resistance-sections R, through coil O, through reversing-switch R' S', through armature and field of motor M, switch $a^2$, the three upper resistance-sections R, switch R' S', through armature-field of motor M', to earth. The motors are thus connected in series with all the resistances in circuit. The closing of switch $e^3$ lifts the bridging member $e^4$ away from its contacts, thereby opening the circuit of magnet-coil $r$ and rendering the actuating magnetism for the reversing-switch R' S' inoperative until the motor-circuit is again opened. In this manner the controlling-switches for the motors are interlocked with the reversing-switch. At the closing of switches $e^2$ and $e^3$ the spring-pressed pawl $e$ engages the cam $e'$ and rotates shaft J another step, thereby placing spring $j$ under tension. The sleeve K cannot rotate, however, since the toothed wheel $k$ has been brought into engagement with the core $l$ of the solenoid L. Further operation of the controlling-switches is thus prevented as long as the master-controller is held in position $s$. Position $s$ therefore corresponds to series position of the motors with all the resistance in circuit. Now if master-controller H is moved to position $s'$ another circuit is completed, as follows: from trolley T, finger $h'$, finger $h^3$, train-line 2, magnet-coil L, through bridging member $o$ of throttle O, to earth. Solenoid L is thus energized and raises its core $l$ out of engagement with the toothed wheel $k$. Sleeve K is thus free to revolve, retarded by the dash-pot $g$. The upward movement of switch G will result in the successive substitution of magnet-coils D, C, and B for sections of the resistance R', as may be seen by tracing out the circuits. Successive sections of resistance R are thus cut out, shaft J being rotated step by step by the successive closing of the several circuit-closers. As switch member G reaches its upper limit of travel bridging member $g'$ is brought into engagement with the stationary contacts $g^2$. At this upper limit of its travel magnet-coils A to E are all energized, the motors M M' are connected in series with all resistance cut out of the motor-circuit. This continues as long as master-controller H is maintained at position $s'$, which is consequently the full-series position. When master-controller H is moved to position $p$, the circuit through solenoid L is broken and another circuit is closed, as follows: from trolley T to finger $h'$, finger $h^2$, train-line 1, solenoid F, stationary contacts $g^2$, bridging member $g'$, bridging member $o$, to earth. Solenoid F is thus energized, raising bridging member $f'$ into engagement with stationary contacts $f^5$, thereby closing a maintaining-circuit for itself through this bridging member and resistance $R^3$ to earth. The discriminating device $f$ is not free to follow the core of solenoid F, however, since it is engaged by the switch member $a^2$ in its closed position. Spring $f^3$ is placed under strain consequently by the upward movement of the core of solenoid F. This condition lasts only a moment, however, since the raising of bridging member $f'$ from stationary contacts $f^4$ opens the circuit of coils A to E and permits the several switches controlled thereby to drop to open position. At the same time shaft J is released and is returned to its off position, as shown by the weight of switch member G and the dash-pot piston or by any other suitable means. The dash-pot piston is preferably provided with a check-valve (not shown) to permit its free downward movement. As soon as switch $a^2$ opens the device $f$ is released and is drawn quickly upward by the spring $f^3$, bringing bridging member $f^2$ into engagement with stationary contacts $f^4$. By means of bridging member $f^2$ the circuit of coil A is again closed and switches $a^2$ to $a^4$ are again pressed toward their closed position. This time, however, switch $a^2$ is prevented from closing, while switches $a^3$ and $a^4$ are permitted to close. By the raising of the core of magnet-coil A shaft J is again rotated one notch and switch member G moved by one step, as has been heretofore explained. As soon as switch member G has completed this step coil E is again energized and switches $e^2$ and $e^3$ are closed. Circuits are then completed as follows: from trolley T to switches $e^2$ and $e^3$. Here the current divides, one part passing through switch $e^2$, switch $a^3$, upper set of resistances R, through reversing-switch R' S', through motor M' to ground, and the other passing through switch $e^3$, through the lower set of resistances R, through throttle O, through reversing-switch R' S', through motor M, through switch $a^4$ to ground. The motors are thus connected in parallel, each having in series with it one-half of the total number of resistance-sections R. Although the upward movement of the core of magnet-coil E has placed the spring $j$ under strain, the sleeve K is again prevented from rotation by the core $l$ of magnet-coil L. Further operation of the controlling-switch is thus prevented as long as the master controlling-switch remains at position $p$. When, however, the master controlling-switch H is moved to position $p'$, coil L is again energized and sleeve K released. The shaft J is then actuated step by step to raise the switch member G, and thereby to cut out the several resistance-sections from the motor-circuits in the manner that has been heretofore explained. When switch member G is at its upper limit of travel, all the resistances are cut out of the motor-circuits. Position $p'$ thus corresponds to the full parallel position of the master controlling-switch.

If at any time during the operation of the system the current rises above a predetermined limit, the throttle O will act to open the control-circuit and prevent further acceleration until the current has fallen to its proper value.

Although in the foregoing description the master controlling-switch H has been assumed to move step by step from one position to another, the sequence of events in the control-circuit will be exactly the same as has been described if the master-controller is moved at once to its full parallel position. Coil F, which permits the parallel connection of the motors, is inoperative until the automatic controlling-switch G has reached the upper limit of its travel. Consequently parallel connection of the motors cannot be obtained until the motors have been connected in series and all resistance cut out, and when the motors are connected in parallel the resistances must all be thrown into the motor-circuit again and again cut out.

When it is desired to stop the train or to cut off the supply of current to the motors, the master-controller is moved to its off position. All the magnet-coils will then be deënergized and the shaft J will be returned to its initial position.

During the operation the acceleration may be arrested at any time without interrupting the supply of current to the motors by moving the master-controller from position $s'$ to position $s$ or from position $p'$ to position $p$, as the case may be, thereby deënergizing magnet-winding L and arresting the step-by-step movement of the controlling-switch G.

When it is desired to reverse the direction of movement of the train, the master reversing-switch RS is thrown to position $r$. The circuit is then broken through coil $n'$ and closed through coil $r$; provided the motor-circuit is open at switch $e^3$. The reversing-switch R′ S′ will then be pulled over to its opposite position and the relative connections of the fields of armatures of the motors will be reversed. When the motor-circuit is again closed by the closing of switches $e^2$ and $e^3$, the circuit of magnet-coil $n'$ will be opened by switch member $e^4$, since the connection of coil $n'$ is changed by the rotation of reversing-switch R′ S′, as may be seen from inspection.

Although I have shown an equipment for a single car, it will be understood that it is applicable to the control of a train, each car containing an equipment similar to that illustrated and all controllable from a master-controller in one of the cars.

Although I have shown a spring as the means for placing a strain upon the controlling-switch G, it is evident that other strain-producing means may be used, if preferred. Similarly any well-known form of retarding device may replace the dash-pot $g$ without altering the operation of the system.

Other changes in the construction and arrangement of parts may be made without departing from the spirit and scope of my invention, and I aim in the appended claims to cover all such variations and modifications in my invention.

What I claim as new, and desire to secure by Letters Patent of the United States, is—

1. In combination, a plurality of normally open switches, means for closing each of said switches, a controlling device arranged to be placed successively under strain by the closing of each switch and adapted by its movement to actuate successively the closing means of the remaining switches, and means for retarding the movement of said device.

2. In combination, a plurality of normally open switches, means for closing each of said switches, a controlling device arranged in its several positions to actuate the closing means for the several switches, connections between each of said switches and said device whereby the closing of one switch places a strain upon said device tending to move it to actuate the closing means for another switch, and means for retarding the movement of said device.

3. In combination, a controlled circuit, a plurality of normally open switches for controlling said circuit, means for closing each of said switches, a controlling device arranged in its several positions to actuate the closing means of the several switches, connections between each of said switches and said device whereby the closing of one switch places a strain upon said device tending to move it to actuate the closing means for another switch, and means controlled by the current in the controlled circuit for automatically arresting the movement of said controlling device.

4. In combination, a plurality of normally open switches, means for closing each of said switches, a controlling device arranged in its several positions to actuate the closing means for the several switches, and connections between the several switches and said device whereby the closing of the several switches produces a step-by-step movement of said device.

5. In combination, a plurality of normally open switches, means for closing each of said switches, manually-operated means for actuating the closing means of one of said switches, an automatic controlling device arranged in its several positions to actuate the closing means of the several switches, and connections between said switches and said device whereby the closing of the several switches produces a step-by-step movement of said device.

6. In combination, a plurality of normally open switches, means for closing each of said switches, manually-operated means for actuating the closing means of one of said switches, an automatic controlling device arranged to be placed successively under strain by the closing of each switch and adapted by its movement to actuate successively the closing means of the remaining switches, and means for retarding the movement of said device.

7. In combination, a controlled circuit, a plurality of normally open switches for controlling said circuit, means for closing each of said switches, manually-operated means for actuating the closing means of one of said switches, an automatic controlling device arranged in its several positions to actuate the closing means for the several switches, connections between said switches and said device whereby the successive closing of the several switches produces a step-by-step movement of said device, and means controlled by the current in the controlled circuit for automatically arresting the movement of said device.

8. In combination, a plurality of normally open switches, a magnet-winding for closing each of said switches, an automatic controlling-switch arranged in its several positions to close the circuits of the several magnet-windings, and connections between the several switches and the controlling-switch whereby the successive closing of the several switches produces a step-by-step movement of said controlling-switch.

9. In combination, a plurality of normally open switches, a magnet-winding for closing each switch, an automatic controlling-switch arranged to be placed successively under strain by the successive closing of the several switches and adapted by its movement to close successively the circuits of the several magnet-windings, and means for retarding said movement.

10. In combination, a plurality of normally open switches, a magnet-winding for closing each switch, an automatic controlling-switch arranged in its several positions to close the circuits of the several magnet-windings, connections between each of said switches and said controlling-switch whereby the closing of one switch places a strain upon said controlling-switch tending to move it to close the circuit of the magnet-winding for another switch, and means for retarding the movement of said controlling-switch.

11. In combination, a controlled circuit, a plurality of normally open switches for controlling said circuit, a magnet-winding for closing each switch, a manually-operated switch for closing the circuit of one of said magnet-windings, an automatic controlling-switch arranged in its several positions to close the circuits of the several magnet-windings, connections between the several magnetically-operated switches and said controlling-switch whereby the closing of one of said switches places a strain upon said controlling-switch tending to move it to close the circuit of the magnet-winding of another switch, an overload device in the controlled circuit, and means controllable both by said device and by said manually-operated switch for arresting the movement of said controlling-switch.

12. In combination, a plurality of normally open switches, a magnet-winding for closing each switch, a member adapted to be moved step by step by the successive closing of said switches, an automatic controlling-switch arranged to be placed under strain by the movement of said member and to close successively by its movement the circuits of the several magnet-windings, and means for retarding the movement of said switch.

13. In combination, a plurality of normally open switches, means for closing each of said switches, a controlling device arranged in its several positions to actuate the closing means for the several switches, connections between the several switches and said device, whereby the closing of the several switches produces a step-by-step movement of said device, and means whereby the operation of said switches and said device is started and stopped from a distant point.

14. In combination, a plurality of normally open switches, means for closing each of said switches, a controlling device arranged in its several positions to actuate the closing means for the several switches, connections between each of said switches and said device whereby the closing of one switch places a strain upon said device tending to move it to actuate the closing means for another switch, means for retarding the movement of said device, and means whereby the operation of said switches and said device is started and stopped from a distant point.

15. In combination, a motor, a motor-controller comprising a plurality of normally open switches, means for closing each of said switches, a manually-operated switch for actuating the closing means for one of said switches, an automatic controlling device arranged to be moved by the successive closing of each switch and by its movement to actuate successively the closing means for the remaining switches, an electromagnetically-operated reversing-switch for said motor, and an interlock between said controller-switches and said reversing-switch comprising an auxiliary switch operated by one of said controller-switches and arranged to open the circuit of the electromagnetic operating means for the reversing-switch when the circuit of said motor is closed.

16. In a motor-starting device, a resistance, a plurality of normally open switches adapted to control the amount of resistance in the motor-circuit, means for closing each of said switches, a device arranged to be moved successively by the closing of the several switches and to actuate successively by its movement the closing means for the remaining switches, and means for retarding the movement of said device.

17. In a motor-starting device, a resistance, a plurality of normally open switches adapted to control the amount of resistance in the motor-circuit, means for closing each of said switches, a device arranged to be moved successively by the closing of the several switches and to actuate successively by its movement the closing means for the remaining switches, and means controlled by the current in the motor-circuit for interrupting the movement of said device.

18. In combination, a plurality of motors, a resistance, resistance-controlling switches, switches for connecting said motors in series and parallel relationship, closing means for the several switches, a device arranged to be moved successively by the closing of the several resistance-controlling switches and to actuate successively by its movement the closing means for the remaining resistance-controlling switches, and means for preventing the operation of the parallel controlling-switches until the last resistance-controlling switch has operated.

19. In combination, a plurality of motors, a resistance, resistance-controlling switches, switches connecting said motors in series and parallel relationship, closing means for the several switches, a device arranged to be moved successively by the closing of the several resistance-controlling switches and to actuate successively by its movement the closing means for the remaining resistance-controlling switches, means for preventing the operation of the parallel controlling-switches until the last resistance-controlling switch has operated, and means controlled by the parallel controlling-switches for opening all the resistance-controlling switches when said parallel controlling-switches close.

20. In combination, a motor, a resistance in circuit therewith, a plurality of normally open switches adapted to short-circuit portions of said resistance, means for closing each of said switches, a device arranged to be moved successively by the closing of the several switches and to actuate successively by its movement the closing means for the remaining switches, and means for arresting the movement of said device at any desired point.

21. In combination, a plurality of normally open switches, means for closing each switch, a rotatable shaft adapted and arranged to be rotated step by step by the successive closing of said switches, a device arranged to actuate in its several positions the closing means for the several switches, flexible connections between said device and said shaft whereby said device is placed under strain by the rotation of said shaft, and means for retarding the movement of said device.

22. In combination, a plurality of normally open switches, means for closing each switch, a rotatable shaft adapted and arranged to be rotated step by step by the successive closing of said switches, a device arranged to actuate in its several positions the closing means for the several switches, flexible connections between said device and said shaft whereby said device is placed under strain by the rotation of said shaft, means for retarding the movement of said device, and means for arresting the movement of said device under said strain.

23. In combination, a rotatable shaft, a device flexibly connected to said shaft so as to be placed under strain by the rotation thereof, a plurality of switches controlled by the movement of said device, and connections between said switches and said shaft whereby the movement of each switch produces a further rotation of said shaft.

24. In a system of train control, a plurality of motors, resistances, a plurality of motor-controllers comprising resistance-controlling switches, closing means for each switch, and a device arranged to be moved successively by the closing of the several switches and to actuate successively by its movement the closing means for the remaining switches, and a master-controller adapted to actuate the closing means for the first of said switches in each controller and to arrest the operation of said device at any desired point.

25. In a system of train control, a plurality of motors, resistances, a plurality of motor-controllers comprising resistance-controlling switches, means for closing each switch, a device arranged to be moved successively by the closing of the several switches and to actuate successively by its movement the closing means for the remaining switches, and means for retarding the movement of said device, and a master-controller adapted to start and stop the operation of the said motor-controller.

In witness whereof I have hereunto set my hand this 31st day of May, 1904.

EUGENE R. CARICHOFF.

Witnesses:
 E. S. MORGAN,
 L. C. FOSS.